(12) United States Patent
Hasan

(10) Patent No.: US 6,665,991 B2
(45) Date of Patent: Dec. 23, 2003

(54) SEAM PLATE FOR RETAINING ROOF DECKING MEMBRANE

(75) Inventor: Riaz Hasan, Palatine, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/449,619

(22) Filed: Jun. 2, 2003

(65) Prior Publication Data

US 2003/0196398 A1 Oct. 23, 2003

Related U.S. Application Data

(63) Continuation of application No. 09/933,230, filed on Aug. 20, 2001.

(51) Int. Cl.[7] ................................................. E04B 5/00
(52) U.S. Cl. ......................... 52/410; 52/408; 411/545; 411/466
(58) Field of Search .................... 52/410, 512, 506.05, 52/408; 411/545, 461, 462, 463, 466

(56) References Cited

U.S. PATENT DOCUMENTS

| | | |
|---|---|---|
| 1,435,134 A | 11/1922 | Boley |
| 2,334,406 A | 11/1943 | Gray |
| 4,361,997 A | 12/1982 | Decaro |
| 4,380,413 A | 4/1983 | Dewey |
| 4,455,804 A | 6/1984 | Francovitch |
| 4,467,581 A | 8/1984 | Francovitch |
| 4,476,660 A | 10/1984 | Francovitch |
| 4,520,606 A | 6/1985 | Francovitch |
| 4,630,422 A | 12/1986 | Beneze |
| 4,630,984 A | 12/1986 | Reinwall et al. |
| 4,641,472 A | 2/1987 | Young |
| 4,726,164 A | 2/1988 | Reinwall et al. |
| 4,744,187 A | 5/1988 | Tripp |
| 4,763,456 A | 8/1988 | Giannuzzi |
| 4,787,188 A | 11/1988 | Murphy |
| 4,803,823 A | 2/1989 | Stenson |
| 4,900,208 A | 2/1990 | Kaiser et al. |
| 4,945,699 A | 8/1990 | Murphy |
| 4,987,714 A | 1/1991 | Lemke |
| 5,069,589 A | 12/1991 | Lemke |
| 5,102,275 A | 4/1992 | Hulsey |
| 5,217,339 A | 6/1993 | O'Connor et al. |
| 5,255,485 A | 10/1993 | Lemke |
| 5,267,423 A | 12/1993 | Giannuzzi |
| 5,378,102 A | 1/1995 | Mossman |
| 5,709,059 A | 1/1998 | Murphy et al. |
| 5,803,693 A | 9/1998 | Choiniere et al. |
| 5,915,903 A | 6/1999 | Osterle et al. |
| 6,205,730 B1 | 3/2001 | Hasan et al. |
| 6,250,034 B1 | 6/2001 | Hulsey |

FOREIGN PATENT DOCUMENTS

| | | |
|---|---|---|
| CH | 635907 | 4/1983 |
| DE | 85 25 358 | 2/1986 |
| FR | 1362380 | 4/1964 |
| GB | 2027786 | 8/1979 |
| NL | 77 00 937 | 8/1978 |

*Primary Examiner*—Carl D. Friedman
*Assistant Examiner*—Jennifer I. Thissell
(74) *Attorney, Agent, or Firm*—Schwartz & Weinrieb

(57) ABSTRACT

A stress plate or seam plate for use in connection with securing membrane sheets to underlying roofing decking substructure comprises a circular disk having a central aperture for receiving a screw fastener. A plurality of concentric ribs are defined between the central aperture and the peripheral edge of the plate for providing reinforcing and bending or flexibility characteristics to the stress plate or seam plate, and in accordance with the principles and teachings of the present invention, a plurality of circumferentially spaced, downwardly extending projections having substantially V-shaped cross-sectional configurations are provided upon the underside of the seam or stress plate so as to engage the membrane sheets and retain the same at their desired locations upon the underlying roofing deck substructural assembly. Contrary to conventional stress plates having sharp-pointed prongs or tangs, the projections of the present invention have substantially rounded or radiused apices so as not to puncture or rupture the membrane sheets.

35 Claims, 5 Drawing Sheets

(PRIOR ART)　(PRIOR ART)　(PRIOR ART)

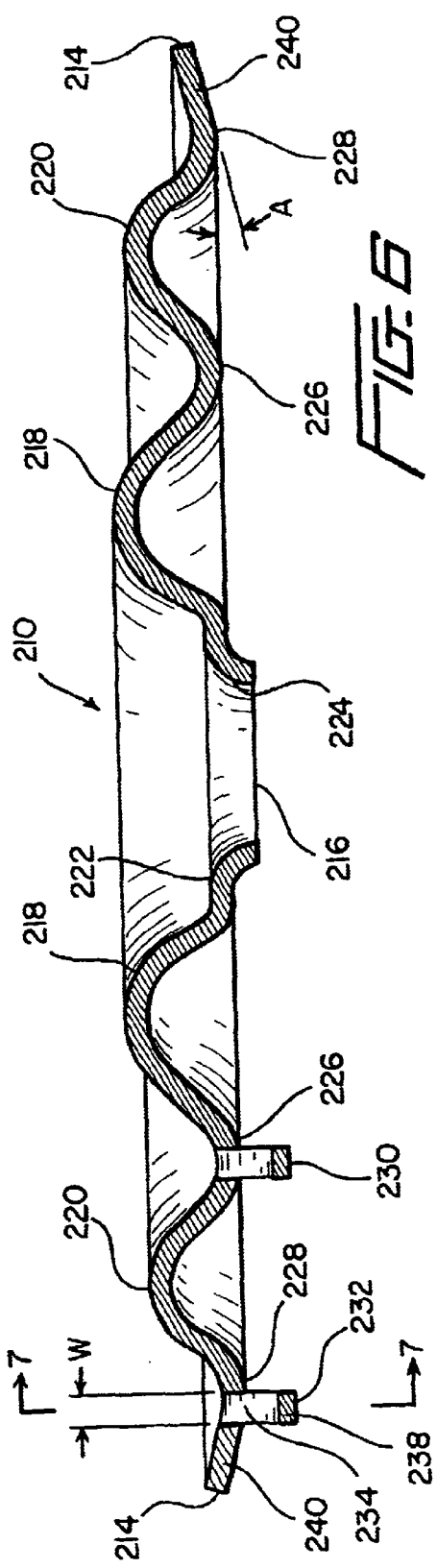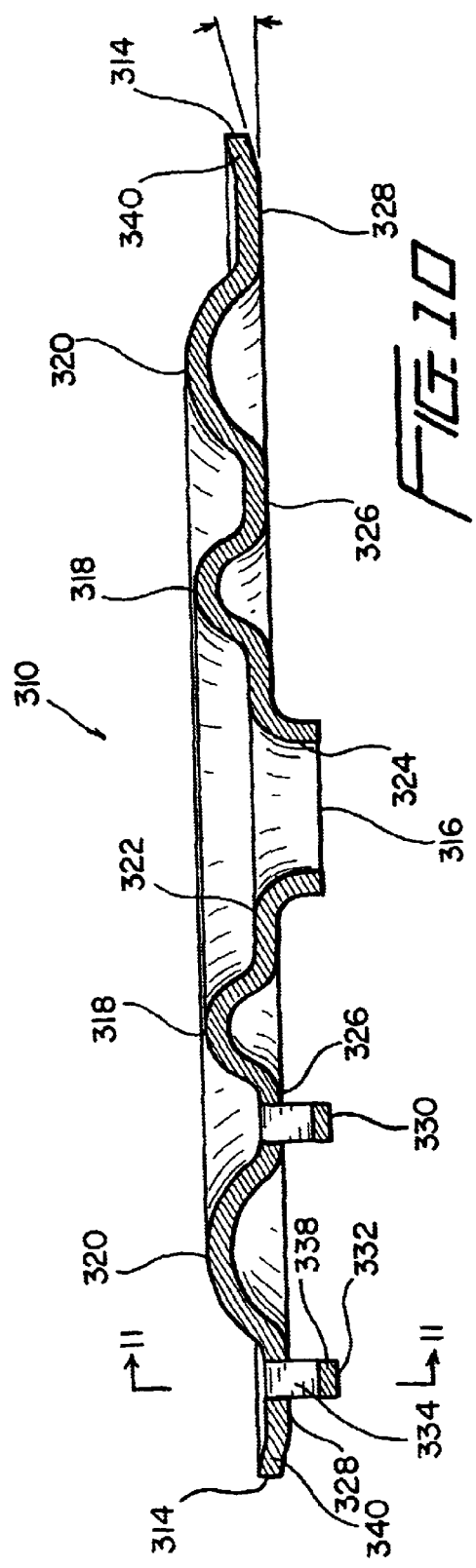

SEAM PLATE FOR RETAINING ROOF DECKING MEMBRANE

This application is a continuation of Ser. No. 09/933,230 filed Aug. 20, 2001.

FIELD OF THE INVENTION

The present invention relates generally to seam plates for use in connection with the retention of roof decking membranes upon roof decking substructures at seam locations defined between separate, adjacent, and overlapping membrane members, and more particularly to a new and improved seam plate, and a roof decking system employing the same, wherein improved retention of the membrane member upon the roof decking substructure is able to be achieved without generating or initiating tearing or other similar deterioration of the roof decking membrane when the membrane is subjected to wind or other environmental forces.

BACKGROUND OF THE INVENTION

Stress plates or seam plates are used in connection with the retention of roof decking membranes upon roof decking substructures at seam locations defined between separate but adjacent or overlapping membrane members, and are of course well-known in the art. Examples of such seam plates or stress plates are disclosed within U.S. Pat. No. 4,945,699 which issued to Colin R. Murphy on Aug. 7, 1990, as well as U.S. Pat. No. 4,787,188 which also issued to Colin R. Murphy on Nov. 29, 1988. As can be appreciated from FIGS. 1,2, and 3A–3C of the drawings, which substantially correspond to FIGS. 4,1, and 3A–3C, respectively, of the aforenoted U.S. Pat. No. 4,945,699 patent to Murphy, the roof decking substructure is disclosed at 103 and may conventionally be provided with overlying insulation 102. The insulation 102 is, in turn, adapted to have membranes disposed thereon in an overlying manner, and at a location or site at which separate and adjacent membranes are to be in effect seamed together in an overlapping manner, a first underlying membrane is disclosed at 101 and is adapted to be secured to the underlying deck substructure 103 by means of a screw fastener 107 passing through a seam plate or stress plate 10, while a second membrane member 104 is adapted to be secured in an overlapping manner upon the first underlying membrane member 101 by means of a welded seam 111.

The seam plate or stress plate 10 is seen to have a circular configuration, and is provided with an upper surface 11 and a lower surface 12. A central aperture 15 is provided for passage therethrough of the screw fastener 107, and a circular reinforcing rib 14 annularly surrounds the central aperture 15. Accordingly, when such a stress plate or seam plate 10 is to be used to secure membrane members to the underlying decking substructure 103, the stress plate or seam plate 10 is disposed atop the first underlying membrane member 101, and the stress plate or seam plate 10 is then fixedly secured to the underlying decking substructure by means of screw fastener 107 being threadedly engaged with the underlying decking substructure. In accordance with the particularly unique stress plate or seam plate 10 as disclosed with the noted Murphy patents, the bottom surface 12 of the stress plate or seam plate 10 is provided with a plurality of circumferentially spaced prongs or tangs 21 each of which terminates in a gripping point 22. The prongs or tangs 21 each have a substantially triangular configuration and are in effect partially punched-out or otherwise cut from the bottom surface portion 12 of the plate 10, and are subsequently bent such that the prongs or tangs 21 attain their desired disposition with respect to the bottom surface portion 12 of the plate 10. Such prongs or tangs 21 will therefore grip the lower or underlying membrane sheet 101 and prevent the same from becoming loose or free with respect to the stress plate 10 or the underlying roof substructure 103 despite wind or other environmental forces being impressed upon the membrane sheet 101.

While the aforenoted stress or seam plates of Murphy have been satisfactory and commercially successful, it has been experienced that, despite well-meaning statements of intent to the contrary as set forth in the Murphy patents, the presence of the pointed prongs or tangs 21 characteristic of the stress plate or seam plate 10 of Murphy do in fact tend to puncture, tear, weaken, and otherwise cause deterioration of the membrane sheets 101 under wind and other environmental conditions. Obviously, such a state is not satisfactory in view of the fact that eventually, the membrane sheets tear away from the overlying seam plate 10 as well as away from the underlying roof decking, with the consequent result being the compromise of the structural integrity of the entire roof decking system.

A need therefore exists in the art for a new and improved stress plate or seam plate wherein the plate can satisfactorily engage the membrane sheets so as to secure the membrane sheets to the underlying decking substructure, and yet, the means formed upon the stress plate or seam plate for engaging the membrane sheets will not tend to initiate tearing of the membrane sheets and thereby cause separation of the sheets with respect to the stress plate or seam plate as well as the underlying decking substructure under, for example, windy or other forceful environmental conditions.

OBJECTS OF THE INVENTION

Accordingly, it is an object of the present invention to provide a new and improved stress plate or seam plate for use in connection with the fixing or securing of membrane sheets to underlying roof decking substructures.

Another object of the present invention is to provide a new and improved stress plate or seam plate for use in connection with the fixing or securing of membrane sheets to underlying roof decking substructures wherein the stress plate or seam plate effectively overcomes the various operational disadvantages or drawbacks characteristic of conventional stress plates or seam plates.

An additional object of the present invention is to provide a new and improved stress plate or seam plate for use in connection with the fixing or securing of membrane sheets to underlying roof decking substructures wherein the stress plate or seam plate effectively overcomes the various operational disadvantages or drawbacks characteristic of conventional stress plates or seam plates by providing the stress plate or seam plate with a plurality of circumferentially spaced, downwardly extending, triangularly configured projections wherein, in lieu of the projections having sharp pointed apex portions, the projections have substantially rounded or radiused apex portions so as not to in fact cause or initiate tearing or rupture of the roof decking membrane sheets under wind or other environmental force conditions.

A further object of the present invention is to provide a new and improved stress plate or seam plate for use in connection with the fixing or securing of membrane sheets to underlying roof decking substructures wherein the stress plate or seam plate effectively overcomes the various operational disadvantages or drawbacks characteristic of conventional stress plates or seam plates by providing the stress plate or seam plate with a plurality of circumferentially spaced, downwardly extending, triangularly configured projections wherein, in lieu of the projections having sharp pointed apex portions, the projections have substantially rounded or radiused apex portions so as not to in fact cause or initiate tearing or rupture of the roof decking membrane sheets under wind or other environmental force conditions, and wherein further, the seam plate or stress plate is also provided with different annular or circular rib structure which imparts various reinforcing and bending or flexibility characteristics to the stress plate or seam plate, as functions of or with respect to the characteristics of the membrane sheets, under such aforenoted wind or other environmental force conditions.

A last object of the present invention is to provide a new and improved stress plate or seam plate for use in connection with the fixing or securing of membrane sheets to underlying roof decking substructures wherein the stress plate or seam plate effectively overcomes the various operational disadvantages or drawbacks characteristic of conventional stress plates or seam plates by providing the stress plate or seam plate with a plurality of circumferentially spaced, downwardly extending, triangularly configured projections wherein, in lieu of the projections having sharp pointed apex portions, the projections have substantially rounded or radiused apex portions so as not to in fact cause or initiate tearing or rupture of the roof decking membrane sheets under wind or other environmental force conditions, and wherein further, the seam plate or stress plate is also provided with different annular or circular rib structure which imparts various reinforcing and bending or flexibility characteristics to the stress plate or seam plate, as functions of or with respect to the characteristics of the membrane sheets, under such aforenoted wind or other environmental force conditions, the various dimensions or extents of the projections and rib structure being capable of being tailored to fit various operational parameters characteristic of the different membrane sheets being employed so as to be operationally compatible therewith.

SUMMARY OF THE INVENTION

The foregoing and other objectives are achieved in accordance with the teachings and principles of the present invention through the provision of a new and improved stress plate or seam plate which comprises a circular structure having a central aperture for receiving a screw fastener. A downwardly projecting annular rib surrounds the central aperture for reinforcing the same, and a plurality of concentric ribs are defined between the central aperture and the peripheral edge of the plate for providing reinforcing and bending or flexibility characteristics to the stress plate or seam plate. The width, height, and shape of the concentric ribs can be varied as functions of the structural parameters or characteristics of the membrane sheets. In addition, in accordance with particularly unique and novel structure provided upon the stress plate or seam plate in accordance with the principles and teachings of the present invention, a plurality of circumferentially spaced, downwardly extending projections having substantially V-shaped cross-sectional configurations are provided upon the underside of the seam or stress plate. Contrary to the PRIOR ART stress plate having the sharp-pointed prongs or tangs provided thereon, the projections of the present invention have substantially rounded or radiused apices so as not to puncture or rupture the membrane sheets, and yet such projections can satisfactorily engage the membrane sheets so as to fixedly retain the same upon the underlying roofing deck substructural assembly. As was the case with the concentric rib structure, the width of the various projections can be varied depending upon the particular structural parameters or characteristics of the membrane sheets being used.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 6 is an enlarged cross-sectional view of the first embodiment of the new and improved seam plate as shown in FIG. 4 and as taken along the lines 6—6 of FIG. 4;

FIG. 7 is a cross-sectional view of the first embodiment of the new and improved seam plate shown in FIG. 6 as taken along the lines 7—7 of FIG. 6;

FIG. 10 is an enlarged cross-sectional view of the second embodiment of the new and improved seam plate as shown in FIG. 8 and as taken along the lines 10—10 of FIG. 8;

FIG. 11 is a cross-sectional view of the first embodiment of the new and improved seam plate shown in FIG. 10 as taken along the lines 11—11 of FIG. 10.

DETAILED DESCRIPTION OF THE PREFERRED EMBODIMENT

Figure 1:
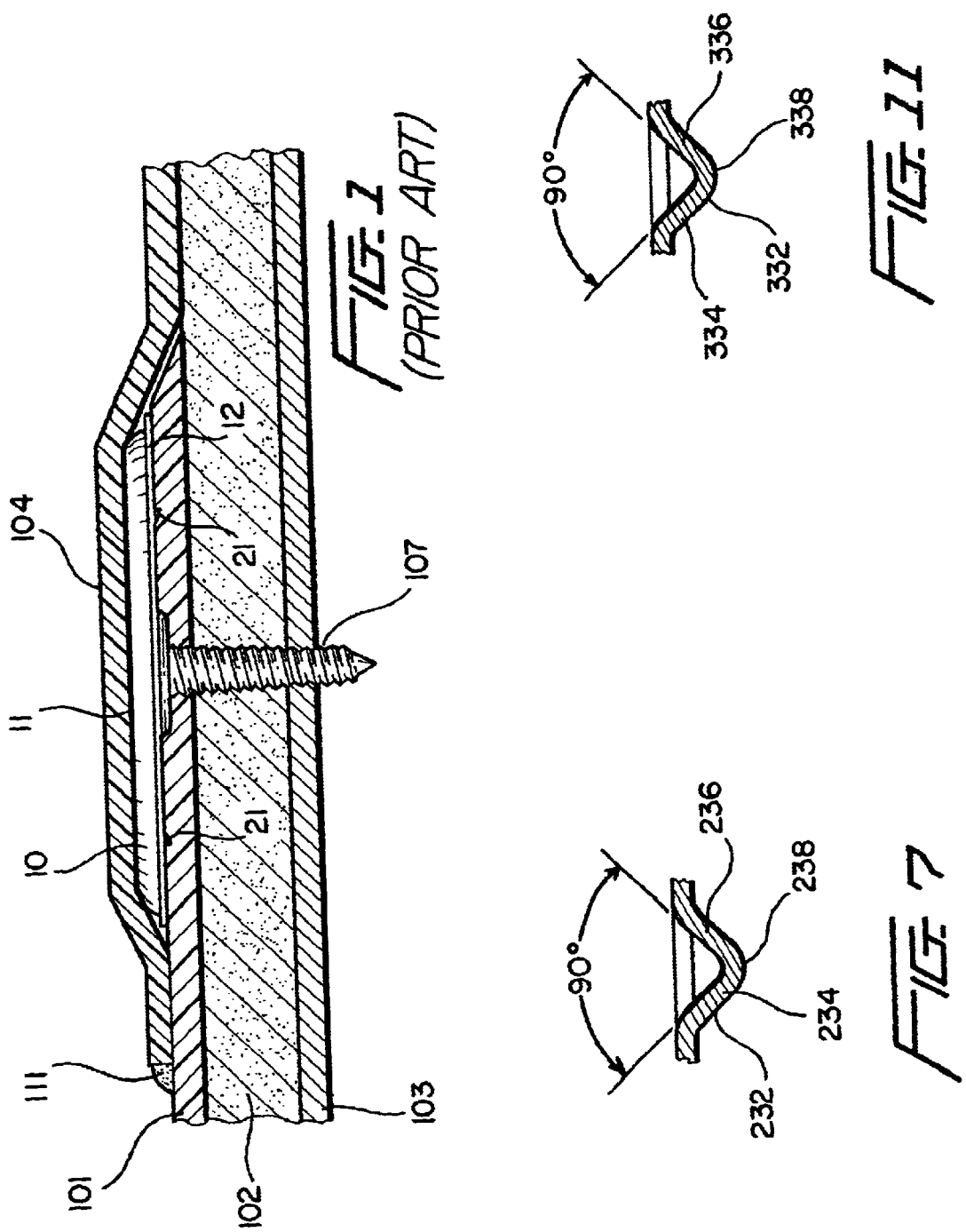
FIG. 1 is a cross-sectional view of a PRIOR ART roof decking system or assembly showing the conventional mounting of a stress plate or seam plate at the seamed location of two overlapping membrane sheets as secured to the underlying roofing decking substructure.
Figure 2:
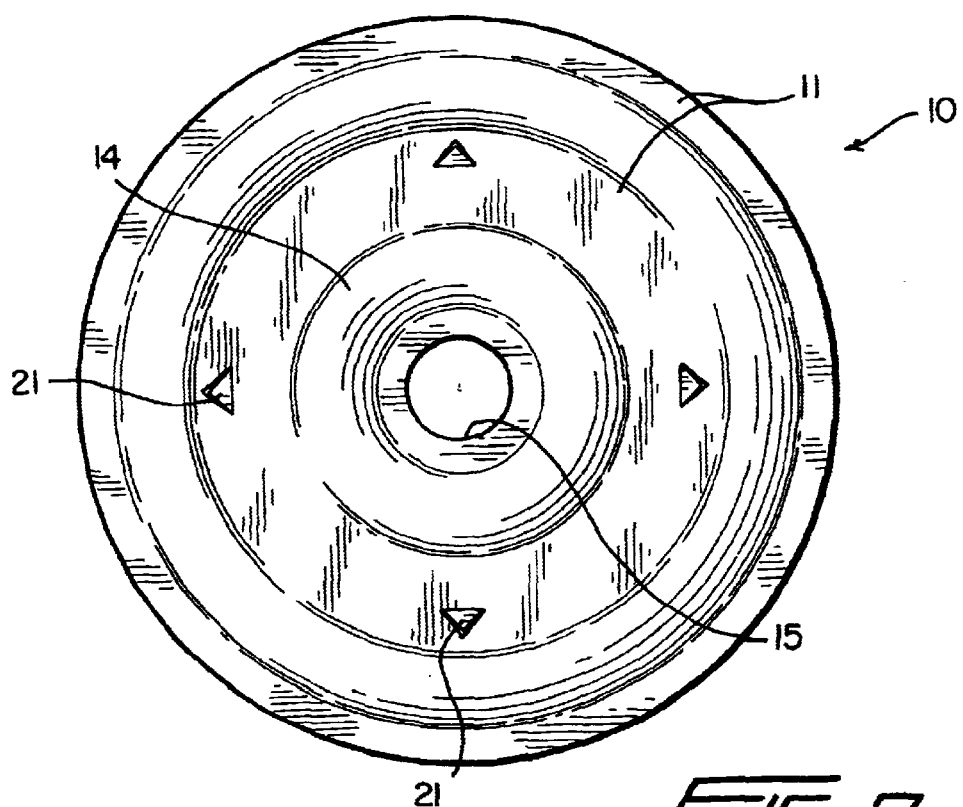
FIG. 2 is a top plan view of the PRIOR ART seam plate or stress plate used within the PRIOR ART roof decking system or assembly disclosed within FIG. 1.

Referring now to the drawings, and more particularly to FIGS. 4–7 thereof, a first embodiment of a new and improved seam plate, constructed in accordance with the principles and teachings of the present invention and showing the cooperative parts thereof, is disclosed and is generally indicated by the reference character 210. More particularly, and in an overall general sense, it is seen that the seam plate 210 comprises a substantially planar plate or disk 212 which has a circular configuration wherein the diametrical extent of the same is approximately 3.00 inches.

The plate or disk 212 has an outer peripheral edge portion 214, and is also provided with a central aperture 216 for receiving therethrough, for example, a threaded fastener, not shown, which may be similar to the threaded fastener 107 shown in conjunction with the conventional stress plate or seam plate 10 illustrated in FIG. 1, whereby the seam or stress plate 210 may be fixedly secured to an underlying roof decking substructure, also not shown but similar to the roof decking substructure 103 as shown in the conventional roof decking assembly of FIG. 1, in order to in turn fixedly secure roof decking membrane sheets to the underlying roof decking substructure. In accordance with the particularly unique and novel structure developed in accordance with the principles and teachings of the present invention, it is seen that the seam plate 210 is provided with unique and novel structure which is specifically structured to fixedly secure membrane sheets to the underlying roof decking substructure without causing tearing, rupture, or other deterioration of the membrane sheets when exposed, for example, to wind or other forceful environmental conditions.

Figure 5:
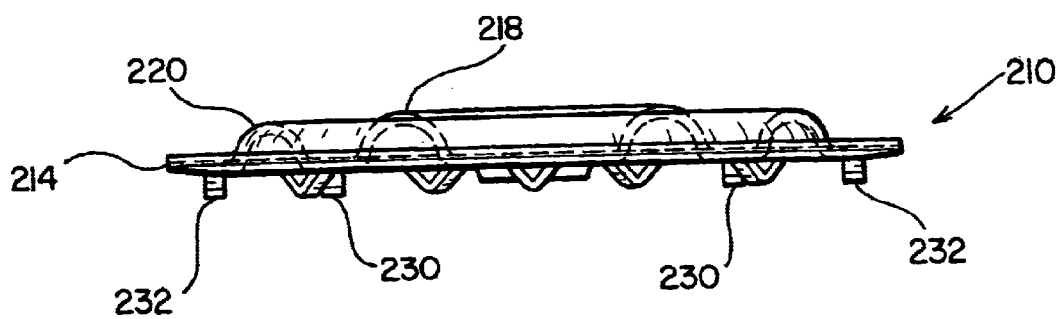
FIG. 5 is a side elevational view of the first embodiment of the new and improved seam plate shown in FIG. 4.
Figure 8:
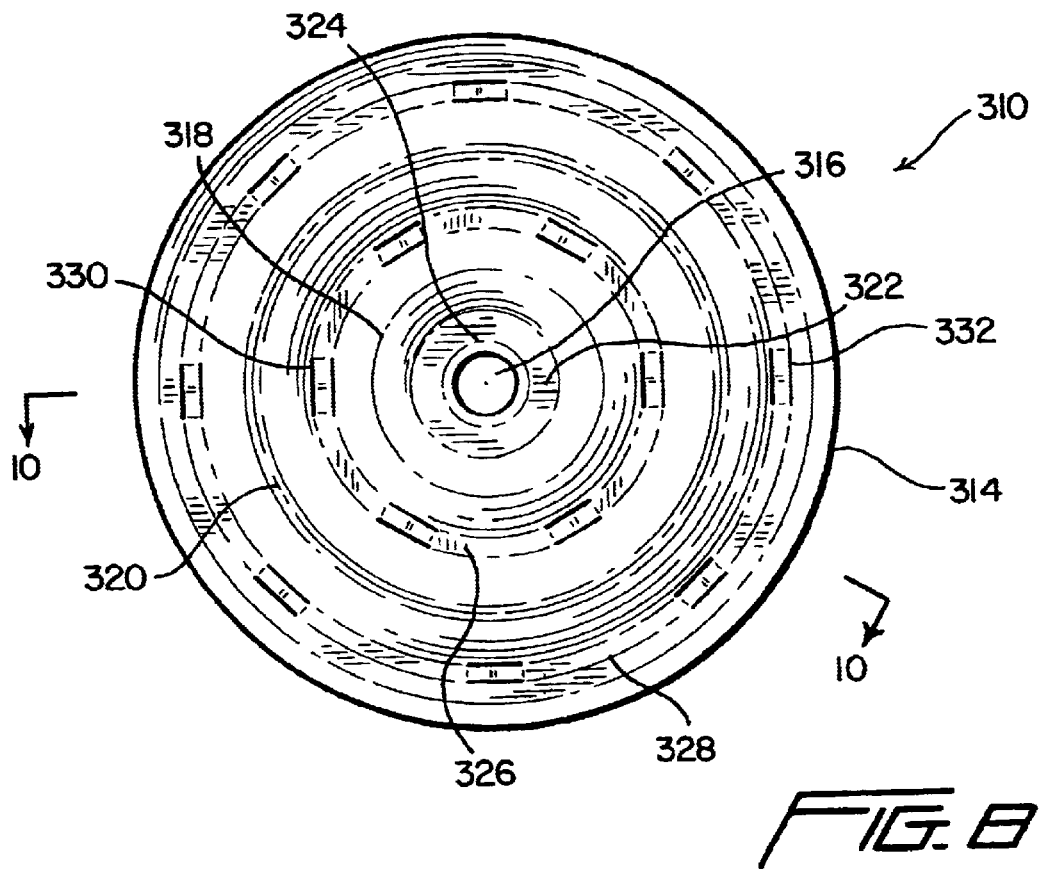
FIG. 8 is a top plan view similar to that of FIG. 4 showing, however, a second embodiment of a new and improved seam plate constructed in accordance with the principles and teachings of the present invention and showing the cooperative parts thereof.
Figure 9:
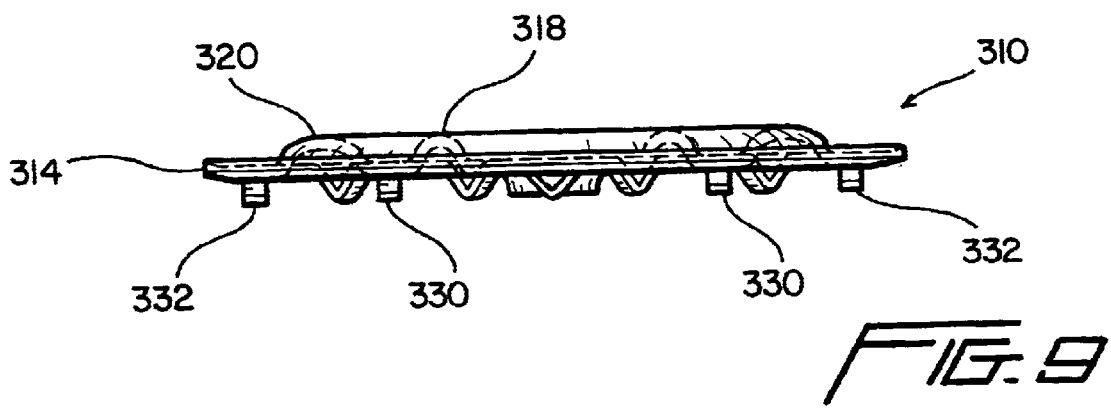
FIG. 9 is a side elevational view of the second embodiment of the new and improved seam plate shown in FIG. 8.

More particularly, as can best be appreciated from FIGS. 5 and 6, it is seen that the seam plate 210 has a substantially sinusoidal cross-sectional configuration as defined in effect by means of a reinforcing rib system comprising a plurality of concentrically disposed annular rib members. Specifically, it is seen that the rib system comprises a first, radially inner, upwardly extending annular rib member 218 and a second, radially outer, upwardly extending annular rib member 220 wherein it is appreciated that the first, radially inner, upwardly extending annular rib member 218 is larger in both radial extent and elevational height than the second, radially outer upwardly extending annular rib member 220 so as to in effect provide the seam plate 210 with somewhat greater rigidity within its radially inner region and a somewhat greater flexibility within its radially outer region. In this manner, greater or larger reinforcing characteristics can effectively be provided to the seam plate 210 within its radially inner region, particularly in connection with the region surrounding the central aperture 216 and within which the threaded fastener, not shown, will be mounted in order to fixedly secure the seam plate 210 to the underlying roofing decking substructure, also not shown. In a similar but somewhat reverse manner, while the second, radially outer, upwardly extending annular rib member 220 obviously provides necessary reinforcement with respect to the radially outer region of the seam plate 210, such reinforcement characteristics will be somewhat less than those imparted to the seam plate 210 by means of the first, radially inner, upwardly extending rib member 218 whereby, in effect, the second, radially outer, upwardly extending rib member 220 provides somewhat greater flexibility to the radially outer region of the seam plate 210. Such somewhat enhanced flexibility within the radially outer region of the seam plate 210 enables such radially outer region of the seam plate 210 to undergo or experience slight bending in order to effectively accommodate uplifting wind or other environmental forces as may be impressed thereon, through means of the membrane sheets, as will be discussed further hereinafter. It is to be further appreciated that in connection with the accommodation or housing of the threaded fastener, not shown, within the central aperture 216, the innermost or centralmost region of the seam plate 210 is seen to further comprise an annular shoulder region 222 upon which the head of the threaded fastener, not shown, can be seated, and in order to further reinforce such fastener seating or shoulder region 222, an axially oriented, downwardly extending annular rib section 224 is integrally connected to the shoulder region 222.

In conjunction with the first and second radially inner and radially outer upwardly extending annular rib members 218,220, the seam plate 210 is seen to further comprise in effect complementary first, radially inner, downwardly extending annular rib member 226, and a second, radially outer, downwardly extending annular rib member 228 wherein it is seen that the first, radially inner, downwardly extending annular rib member 226 is radially interposed between the first and second radially inner and radially outer upwardly extending annular rib members 218,220, whereas the second, radially outer, downwardly extending annular rib member 228 is radially interposed between the second radially outer upwardly extending annular rib members 220 and the peripheral edge portion 214 of the seam plate 210. In order to engage the roofing decking membrane sheets, not shown but similar to membrane sheet 101 as seen in FIG. 1, and retain the same at their desired locations upon the underlying roofing decking assembly, the stress plate or seam plate 210 of the present invention is provided with downwardly extending projections which are similar to the prongs or tangs 21 of the aforenoted PRIOR ART stress plate 10 as shown in FIG. 1, however, the unique and novel structure of such downwardly extending projections constructed in accordance with the principles and teachings of the present invention will not readily tear or puncture the membrane sheets so as to effectively protect such membrane sheets against deterioration and thereby preserve the structural integrity of the same.

Figures 3A, 3B, 3C:
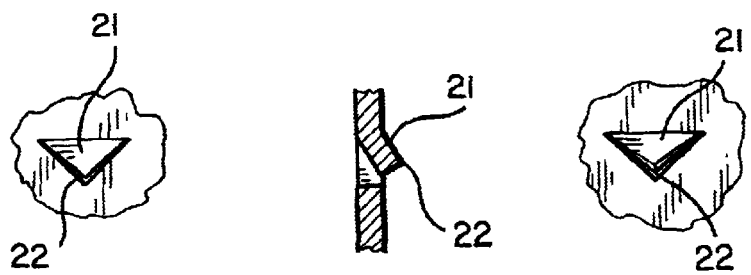
FIGS. 3A, 3B, and 3C are top plan, cross-sectional, and bottom plan views of a portion of the PRIOR ART seam plate or stress plate shown in FIG. 2 so as to specifically illustrate the sharply pointed prongs or tangs of the seam plate or stress plate shown in FIG. 2.
Figure 4:
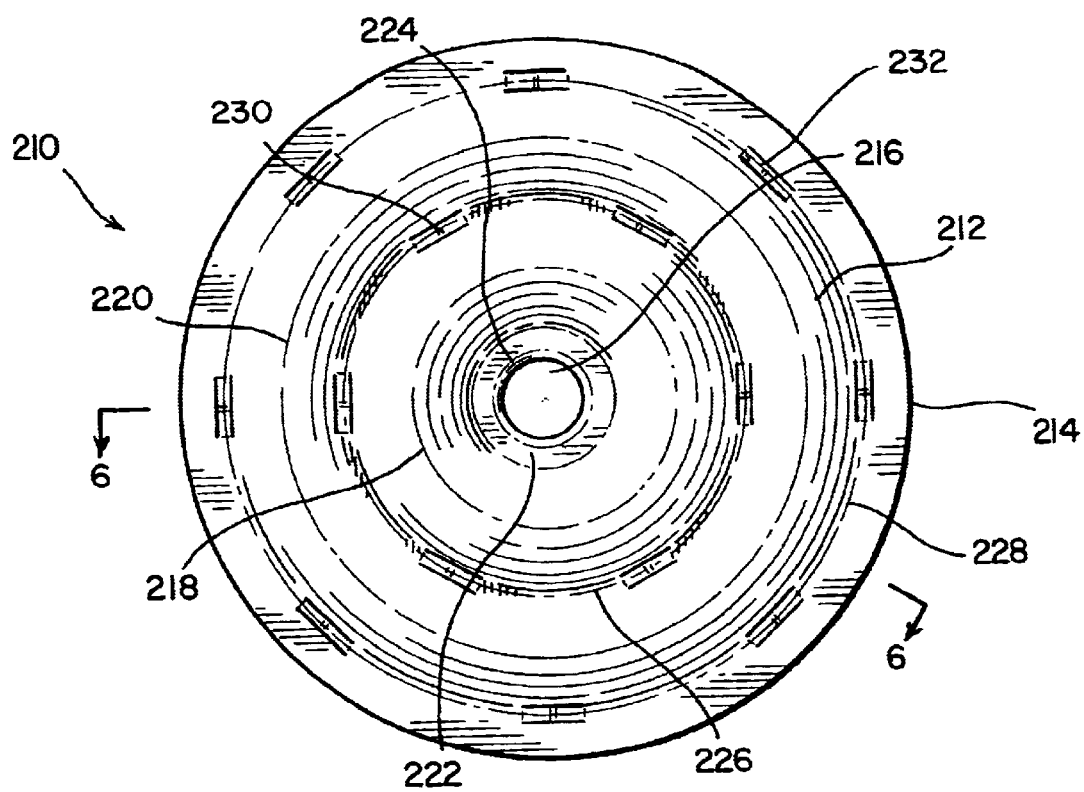
FIG. 4 is a top plan view of a first embodiment of a new and improved seam plate constructed in accordance with the principles and teachings of the present invention and showing the cooperative parts thereof.

More particularly, it is seen that each one of the first and second radially inner and radially outer, downwardly extending annular rib members 226,228 is provided with a plurality of downwardly extending projections 230 and 232, respectively, which are adapted to engage the membrane sheets in a non-invasive or non-destructive manner. As best seen from FIG. 4, the first radially inner downwardly extending annular rib member 226 is provided with a first array of six, equiangularly spaced, circumferentially or annularly arranged projections 230, while the second radially outer downwardly extending annular rib member 228 is provided with a second array of eight, equiangularly spaced, circumferentially or annularly arranged projections 232. The stress plate or seam plate 210 may be fabricated, for example, from a suitable metal material, such as, for example, an aluminum-zinc alloy-coated steel sheet, and in fabricating or forming the downwardly extending projections 230,232, it is seen that each one of the projections 230,232 is effectively struck or punched out from the metal sheet material forming the seam plate 210. It is to be appreciated, however, that in accordance with the unique and novel principles and teachings of the present invention, and contrary to the structure of the prongs or tangs 21 of the PRIOR ART stress plate 10, the projections 230,232 do not exhibit any sharp points as was characteristic of the prongs or tangs 21 of the PRIOR ART stress plate 10 shown explicitly in FIGS. 3A–3C.

To the contrary, as may best be appreciated from FIG. 7, which is specific to projections 232 being formed in connection with radially outer, downwardly extending annular rib member 228, although the structure of each projection 230 is essentially the same as that of each projection 232, it is seen that in lieu of the projections 232 being struck or punched out from the metal sheet material forming the seam plate 210 in a cantilevered manner, as was the case of the prongs or tangs 21 of the PRIOR ART stress plate 10, each one of the projections 232 has a predetermined circumferential extent, is severed along its opposite longitudinally or circumferentially extending sides from the metal sheet material forming the radially outer, downwardly extending annular rib member 228 of the seam plate 210, and is integrally connected at its oppositely disposed longitudinal ends to the metal sheet material forming the radially outer downwardly extending annular rib member 228 of the seam plate 210. Still further, it is also seen that each one of the downwardly extending projections 232 has a substantially V-shaped configuration as defined by means of a pair of leg or side portions 234,236 which are preferably disposed with respect to each other at an included angle of 90°, while a corner or apex portion 238 is defined at the intersection of the leg or side portions 234,236. The opposite ends of the leg or side portions 234,236 are integrally connected to the metal sheet material forming the radially outer downwardly extending annular rib member 228, and it is also seen that the apex portion 238 is rounded or radiused.

In this manner, when the plurality of apex portions 238 of the plurality of projections 232, as well as the similarly structured apex portions of the plurality of projections 230, engage the membrane sheet covering the roofing decking substructure, the rounded or radiused apex portions 238 will not readily tear or rupture the membrane sheets. Accordingly, the membrane sheets will not readily suffer deterioration due to conventional tearing and rupture, and the structural integrity of the membrane sheets, as well as that of the roofing decking substructure assembly will be preserved. It is additionally noted that while the projections 230,232 have been noted as being substantially V-shaped in cross-sectional configuration, such cross-sectional structure is only exemplary. In lieu of the V-shaped configurations as defined by means of leg or side portions 234,236 with the included angle of 90°, the projections 230, 232 can have other configurations which nevertheless provide rounded or radiused portions similar to rounded or radiused apex portions 238. For example, the entire projection 230, 232 could in effect have a semi-circular configuration. The critical feature of the invention resides in the fact that the engagement portion of each projection 230,232 which actually engages the membrane sheet will be rounded or radiused so as not to tear, puncture, or otherwise rupture the underlying membrane sheet.

It is noted still further that, as an example, the width W of each projection 230,232 may be on the order of 0.065 inches, however, depending upon the particular structural composition of the particular membrane sheet in connection with which the stress plate or seam plate 210 is being used, the actual width dimension of each projection 230,232 may be varied. For example, if the particular membrane sheet exhibits relatively low tear resistance or tensile strength values, projections 230,232 may have relatively wider width dimensions so as to engage larger surface areas of the membrane sheet. Similarly, or conversely, if the membrane sheet exhibits relatively high tear resistance or tensile strength values, projections 230,232 may have relatively narrower width dimensions. In a similar manner, the height and width dimensions of the various concentric rib members 218,220,226,228 may likewise be varied depending upon the particular structural composition and strength characteristics of the membrane sheet being used. It is lastly noted with respect to the first embodiment of the stress plate or seam plate 210, constructed in accordance with the principles and teachings of the present invention, that the peripheral flange portion 240 of the seam plate or stress plate 210, as defined between the radially outer, downwardly extending annular rib member 228 and the peripheral edge portion 214, is disposed at an angle A of approximately 13° with respect to the horizontal. The reason for this angular disposition of the flange region 240 is that the upwardly inclined peripheral edge portion 214 will not tend to tear, pierce, or otherwise rupture the membrane sheet under wind uplift or other environmental force conditions. In addition, should the membrane sheet experience uplift under any one of such conditions, it will be disposed, in effect, in surface-to-surface contact with the flange portion 240, as opposed to linear contact with the lower surface edge of the peripheral edge portion 214, whereby in lieu of possibly undergoing or experiencing tearing, piercing, or rupture, the membrane sheet will tend to bend the outer peripheral portion of the seam plate 210 as permitted by means of the flexibility characteristics of the radially outer ribbed region 220 of the seam plate 210.

With reference now being made to FIGS. 8–11, a second embodiment of a stress plate or seam plate, also constructed in accordance with the principles and teachings of the present invention, is disclosed and is generally indicated by the reference character 310. It is to be appreciated that the structure of the second embodiment stress plate or seam plate 310 is substantially the same as that of the first embodiment stress plate or seam plate 210, except for minor modifications which will be discussed hereinafter, and therefore, a comprehensive detailed discussion of the second embodiment stress plate or seam plate 310 will be omitted, with the detailed discussion of the same being confined to the aforenoted minor modifications. In addition, structural parts or components of the second embodiment stress plate or seam plate 310 which correspond to similar parts of the first embodiment stress plate or seam plate 210 will be designated by corresponding reference numerals except that the reference numerals will be in the 300 series.

Accordingly, it is noted that the diametrical extent of the seam plate 310 is slightly less than that of the seam plate 210 and may have a value of, for example, 2.75 inches. In addition, it is seen still further that the elevation or height of both the radially inner and radially outer upwardly extending annular rib members 318 and 320 are substantially the same, however, the radial extent or width of radially inner upwardly extending annular rib member 318 is less than that of radially inner upwardly extending annular rib member 218, while the radial extent or width of radially outer upwardly extending annular rib member 320 is greater than that of radially outer upwardly extending annular rib member 220 such that radially outer upwardly extending annular rib member 320 has a more pronounced flattened configuration. This substantially flattened configuration provides the radially outer portion of the seam plate 310 with somewhat greater flexibility than the radially inner portion of the seam plate 310 in a manner similar to that previously discussed in connection with seam plate 210.

In a similar manner, it is seen that while the radially inner and radially outer downwardly extending annular rib members 326 and 328 are similarly curved or rounded in a substantially sinusoidal manner, the radially inner and radially outer downwardly extending annular rib members 326 and 328 are seen to have substantially flattened configurations. These substantially flattened configurations provide or define more surface contact area between the undersurface portions of the seam plate 310 and the roofing decking membrane sheets. Still further, it is noted that the peripheral flange portion 340 of the seam plate 310 is angled upwardly at an angle B of 12° with respect to the horizontal in a manner similar to that of peripheral flange portion 240 of seam plate 210. This feature, together with, for example, the substantially flattened configuration of both radially outer downwardly extending annular rib member 328 and radially outer upwardly extending annular rib member 320 provides the desired relative flexibility to the radially outer portion of the seam plate 310 so as to accommodate wind uplift and other environmental forces which may act upon the roofing decking membrane sheets and the seam plate 310 without subjecting the membrane sheets to cutting, piercing, and rupturing structure, forces, and phenomena.

Thus, it may be seen that in accordance with the principles and teachings of the present invention, a new and improved stress plate or seam plate has been developed wherein the downwardly extending projections have rounded or radiused apex portions so as to engage the membrane sheets and maintain the same secured to the underlying roofing decking substructure assembly, however, such projections do not tend to tear, puncture, or otherwise rupture the membrane sheets. Accordingly, the structural integrity of the membrane sheets, as well as that of the overall underlying roofing decking substructure assembly, is preserved.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A seam plate for securing a membrane sheet to an underlying substructure, comprising:
   a plate;
   an aperture defined within a central portion of said plate for receiving a fastener for securing said plate to an underlying substructure; and
   a plurality of projections, respectively severed from said plate along first opposite regions, integrally connected to said plate along second opposite regions, and having rounded engagement portions extending downwardly from said plate, and continuously between said second oppositely disposed integrally connected regions, for engaging a membrane sheet so as to effectively secure the membrane sheet to the underlying substructure without piercing the membrane sheet so as not to cause tearing and rupture of the membrane sheet when said plate is fixedly secured to the underlying substructure by the fastener.

2. The seam plate as set forth in claim 1, wherein:
   each one of said plurality of downwardly extending projections has a substantially V-shaped cross-sectional configuration, and said rounded engagement portion of said downwardly extending projection comprises a radiused apex portion of said substantially V-shaped projection.

3. The seam plate as set forth in claim 2, wherein:
   each one of said substantially V-shaped projections comprises a pair of sides with an included angle defined at said apex portion of 90°.

4. The seam plate as set forth in claim 1, wherein:
   each one of said downwardly extending projections is severed from said plate along longitudinally extending sides thereof and are integrally attached to said plate along longitudinally separated ends thereof.

5. The seam plate as set forth in claim 1, wherein:
   a plurality of radially inner and radially outer upwardly and downwardly extending annular rib members are provided upon said seam plate in order to provide said seam plate with reinforcing and flexibility characteristics.

6. The seam plate as set forth in claim 5, wherein:
   said plurality of downwardly extending projections are arranged within circular arrays substantially coincident with said radially inner and radially outer downwardly extending annular rib members.

7. The seam plate as set forth in claim 6, wherein:
   a first radially inner circular array of said downwardly extending projections comprises six projections equiangularly spaced from each other; and
   a second radially outer circular array of said downwardly extending projections comprises eight projections equiangularly spaced from each other.

8. The seam plate as set forth in claim 5, wherein:
   said plurality of radially inner and radially outer upwardly and downwardly extending annular rib members have substantially sinusoidal configurations.

9. The seam plate as set forth in claim 1, wherein:
   each one of said plurality of downwardly extending projections has a substantially semi-circular cross-sectional configuration wherein said rounded engagement portion of said downwardly extending projection is disposed at a lowermost position of said downwardly extending projection for engagement with the membrane sheet.

10. The seam plate as set forth in claim 1, wherein:
    said seam plate has a predetermined geometrical configuration.

11. The seam plate as set forth in claim 10, wherein:
    said predetermined geometrical configuration comprises a substantially circular configuration.

12. A seam plate for securing a membrane sheet to an underlying roof decking substructure, comprising:
    a plate;
    an aperture defined within a central portion of said plate for receiving a fastener for securing said plate to an underlying roof decking substructure; and
    a plurality of projections respectively severed from said plate along first opposite regions, integrally connected to said plate along second opposite regions, and having rounded engagement portions extending downwardly from said plate, and continuously between said second oppositely disposed integrally connected regions, for engaging a membrane sheet so as to effectively secure the membrane sheet to the underlying roof decking substructure without piercing the membrane sheet so as not to cause tearing and rupture of the membrane sheet under wind uplift conditions when said plate is fixedly secured to the underlying roof decking substructure by the fastener.

13. The seam plate as set forth in claim 12, wherein:
    each one of said plurality of downwardly extending projections has a substantially V-shaped cross-sectional configuration, and said rounded engagement portion of said downwardly extending projection comprises a radiused apex portion of said substantially V-shaped projection.

14. The seam plate as set forth in claim 13, wherein:
    each one of said substantially V-shaped projections comprises a pair of sides with an included angle defined at said apex portion of 90°.

15. The seam plate as set forth in claim 12, wherein:
    each one of said downwardly extending projections is severed from said plate along longitudinally extending sides thereof and are integrally attached to said plate along longitudinally separated ends thereof.

16. The seam plate as set forth in claim 12, wherein:
    a plurality of radially inner and radially outer upwardly and downwardly extending annular rib members are provided upon said seam plate in order to provide said seam plate with reinforcing and flexibility characteristics.

17. The seam plate as set forth in claim 16, wherein:

said plurality of downwardly extending projections are arranged within circular arrays substantially coincident with said radially inner and radially outer downwardly extending annular rib members.

18. The seam plate as set forth in claim 17, wherein:

a first radially inner circular array of said downwardly extending projections comprises six projections equiangularly spaced from each other; and a second radially outer circular array of said downwardly extending projections comprises eight projections equiangularly spaced from each other.

19. The seam plate as set forth in claim 16, wherein:

said plurality of radially inner and radially outer upwardly and downwardly extending annular rib members have substantially sinusoidal configurations.

20. The seam plate as set forth in claim 12, wherein:

said plate has an outer peripheral edge portion which is inclined upwardly at a predetermined angle with respect to a horizontal plane such that said outer peripheral edge portion does not puncture and tear the membrane sheet under wind uplift conditions.

21. The seam plate as set forth in claim 12, wherein:

each one of said plurality of downwardly extending projections has a substantially semi-circular cross-sectional configuration wherein said rounded engagement portion of said downwardly extending projection is disposed at a lowermost position of said downwardly extending projection for engagement with the membrane sheet.

22. The seam plate as set forth in claim 12, wherein:

said seam plate has a predetermined geometrical configuration.

23. The seam plate as set forth in claim 22, wherein:

said predetermined geometrical configuration comprises a substantially circular configuration.

24. In combination, a roof decking substructure assembly, comprising:

a roof decking substructure;

a first membrane sheet having a first end portion which is adapted to be secured atop said roof decking substructure;

a second membrane sheet having a second end portion which is adapted to be overlapped and secured to said first end portion of said first membrane sheet so as to form a seamed connection with said first membrane sheet;

a seam plate for securing said first end portion of said first membrane to said roof decking substructure; and a fastener for securing said seam plate to said roof decking substructure;

said seam plate having an aperture defined within a central portion thereof for receiving said fastener for securing said seam plate to said roofing decking substructure; and a plurality of projections respectively severed from said seam plate along first opposite regions, integrally connected to said seam plate along second opposite regions, and having rounded engagement portions extending downwardly from said seam plate, and continuously between said second oppositely disposed integrally connected regions, for engaging said first end portion of said first membrane sheet so as to effectively secure said first end portion of said first membrane sheet to said roof decking substructure without piercing said first end portion of said first membrane sheet so as not to cause tearing and rupture of said first end portion of said first membrane sheet under wind uplift conditions when said seam plate is fixedly secured to said roof decking substructure by said fastener.

25. The combination as set forth in claim 24, wherein:

each one of said plurality of downwardly extending projections has a substantially V-shaped cross-sectional configuration, and said rounded engagement portion of said downwardly extending projection comprises a radiused apex portion of said substantially V-shaped projection.

26. The combination as set forth in claim 25, wherein:

each one of said substantially V-shaped projections comprises a pair of sides with an included angle defined at said apex portion of 90°.

27. The combination as set forth in claim 24, wherein:

each one of said downwardly extending projections is severed from said seam plate along longitudinally extending sides thereof and are integrally attached to said seam plate along longitudinally separated ends thereof.

28. The combination as set forth in claim 24, wherein:

a plurality of radially inner and radially outer upwardly and downwardly extending annular rib members are provided upon said seam plate in order to provide said seam plate with reinforcing and flexibility characteristics.

29. The combination as set forth in claim 28, wherein:

said plurality of downwardly extending projections are arranged within circular arrays substantially coincident with said radially inner and radially outer downwardly extending annular rib members.

30. The combination as set forth in claim 29, wherein:

a first radially inner circular array of said downwardly extending projections comprises six projections equiangularly spaced from each other; and a second radially outer circular array of said downwardly extending projections comprises eight projections equiangularly spaced from each other.

31. The combination as set forth in claim 28, wherein:

said plurality of radially inner and radially outer upwardly and downwardly extending annular rib members have substantially sinusoidal configurations.

32. The combination as set forth in claim 24, wherein:

said seam plate has an outer peripheral edge portion which is inclined upwardly at a predetermined angle with respect to a horizontal plane such that said outer peripheral edge portion does not puncture and tear said first membrane sheet under wind uplift conditions.

33. The combination as set forth in claim 24, wherein:

each one of said plurality of downwardly extending projections has a substantially semi-circular cross-sectional configuration wherein said rounded engagement portion of said downwardly extending projection is disposed at a lowermost position of said downwardly extending projection for engagement with said first membrane sheet.

34. The seam plate as set forth in claim 24, wherein:

said seam plate has a predetermined geometrical configuration.

35. The seam plate as set forth in claim 34, wherein:

said predetermined geometrical configuration comprises a substantially circular configuration.

* * * * *